Feb. 8, 1966   E. H. GREEN   3,233,792
VALVE STRUCTURE FOR PRESSURIZED SPRAY PACKAGE
Filed July 31, 1963   2 Sheets-Sheet 1
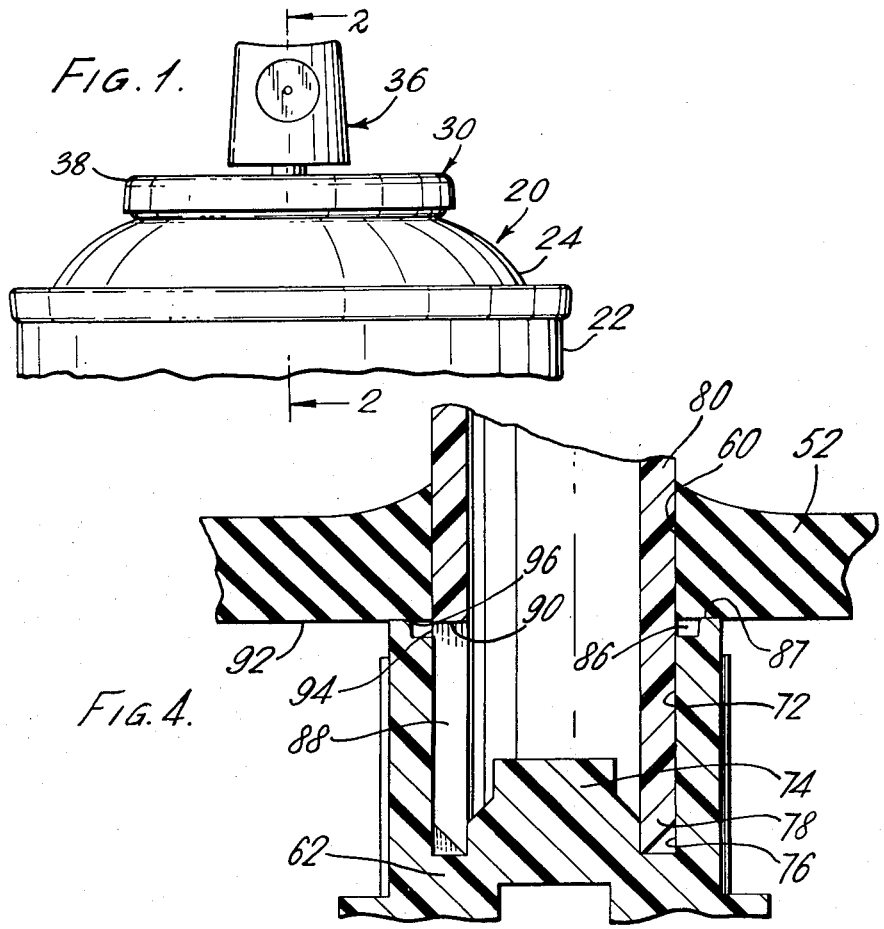
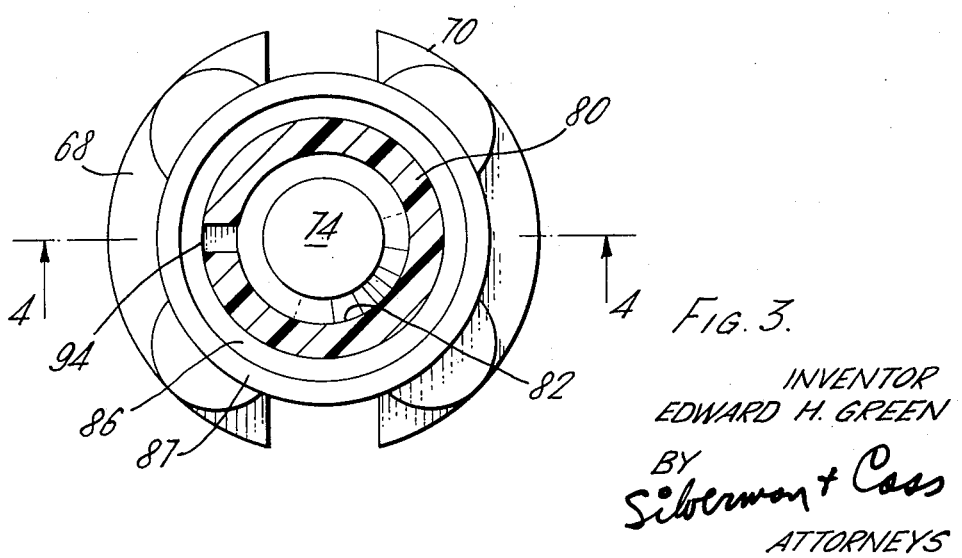
INVENTOR
EDWARD H. GREEN
BY
Silverman + Cass
ATTORNEYS Feb. 8, 1966          E. H. GREEN          3,233,792
VALVE STRUCTURE FOR PRESSURIZED SPRAY PACKAGE
Filed July 31, 1963          2 Sheets-Sheet 2
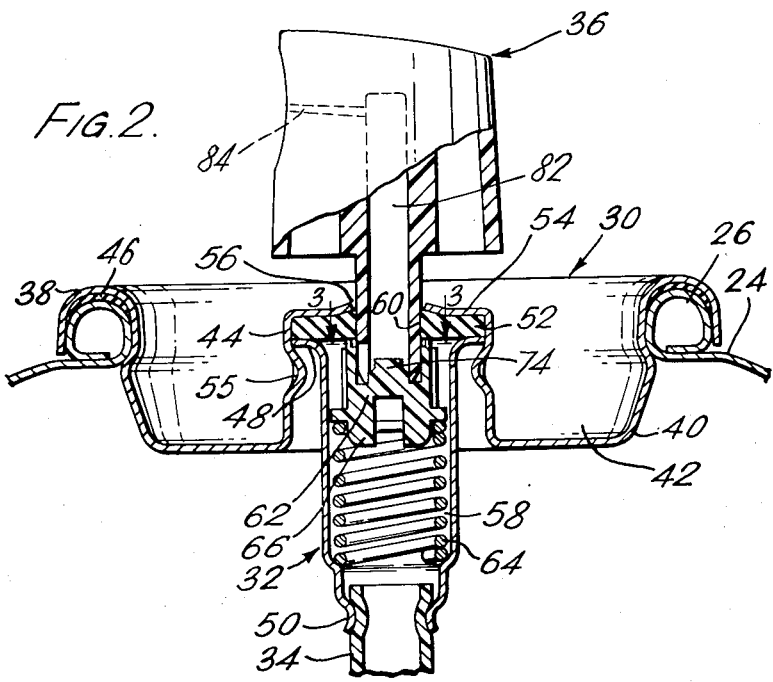
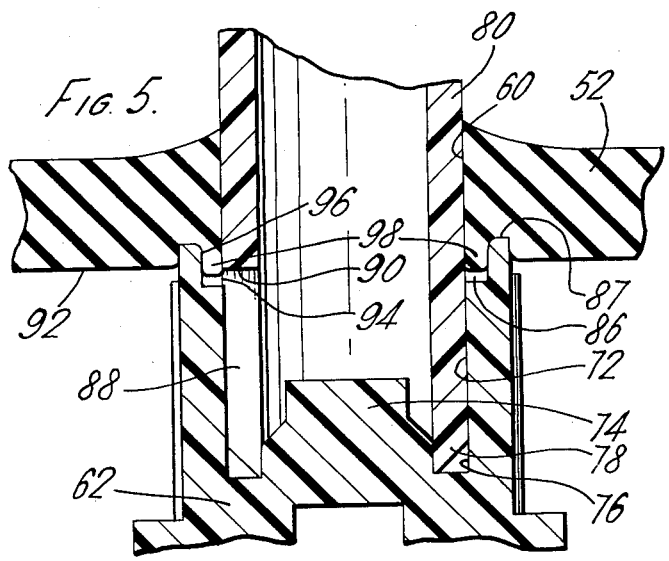
INVENTOR
EDWARD H. GREEN
BY
Silverman & Cass
ATTORNEYS

# United States Patent Office 3,233,792
Patented Feb. 8, 1966

3,233,792
VALVE STRUCTURE FOR PRESSURIZED
SPRAY PACKAGE
Edward H. Green, 11 Army Trail Road, Addison, Ill.
Filed July 31, 1963, Ser. No. 298,946
8 Claims. (Cl. 222—394)

This invention relates generally to so-called aerosol spray packages and more particularly is concerned with a valve structure for use with such packages.

Aerosol spray devices which are referred to herein are actually packages of pressurized material such as paint or insecticide in suitable carriers, such as petroleum spirits or oils combined with propellants in the form of highly volatile liquids. The latter are butane, propane, fluorocarbons and the like.

In U.S. Patent 2,777,735 there is disclosed a valve structure which is especially useful in the dispensing of pressurized products of a heavy nature—notably paints and other suspensions. The structure is characterized by the provision of a cover member on a canister or bottle having a central upstanding boss with an annular gasket of rubber or the like securely clamped in the boss and a hole in the cover member coaxial with the center opening of the gasket. Below the gasket there is clamped a valve housing with a vertically reciprocal spring-urged plunger therein, the housing communicating with the interior of the canister and arranged so that all of the pressuized products must pass into the housing and out through the hole in the cover member by way of the center opening in the gasket, but for the plunger. The plunger in said U.S. Patent 2,777,735 is provided with a valve seat of annular configuration also coxial with the center opening in the gasket, and is urged against the bottom of the gasket by the spring. The valve plunger has a vertical axial socket in its upper end aligned with the center opening in the gasket, and the removable hollow stem of a spray head is engaged in the socket through the hole in the cover member and the center opening of the gasket.

The gasket tightly engages the stem to form a leak-proof connection therewith, but the stem is also slidable through the gasket and hence when the spray head is pressed downwardly, it will force the plunger away from the gasket, unseating the valve seat from the bottom surface of the gasket. A slot in the bottom end of the hollow stem now admits the pressurized product which is permitted to expand in the hollow bore of the stem and is driven out of the external metering orifice provided in the spray head.

Metering is accomplished by controlling the dimensions of the opening formed by that portion of the slot exposed at the plunger valve seat when the stem and valve plunger together are moved downwardly.

Commercial versions of the structure of said patent had the top end of the slot extending upward and entering the gasket since the plunger socket was of substantially uniform diameter and opened at the valve seat. Two disadvantages became apparent. In one of these, where the material from which the stem was molded was subject to softening under the influence of the chemicals or solvents in the pressurized product being dispensed, the constricting action of the tight gasket tended to close the top end of the slot, which of course was that portion which provided the metering. Thus, the upper end of the slot might close down to render the spray head unsuitable or even useless. The second disadvantage was that where clogging materials were being dispensed and it was found necessary from time to time to rotate the spray head with reference to the plunger, the sharp edges of the upper end of the slot which enters the gasket might scrape away rubber from the gasket and gradually cause filling and change in the metering of the slot.

The primary object of the invention is to cure both of these disadvantages and provide a valve structure in which the slot does not enter the gasket.

In order to accomplish this general object, the invention contemplates the provision of a small internal cylindrical pocket in the upper end of the valve plunger, preferably of rectangular cross-section, coaxial with the valve seat but disposed below the same, so that the stem has its slot terminating at or slightly below the valve seat so as never to enter the same.

This construction also gives rise to another important advantage of the invention over the construction of said Patent 2,777,735. When the valve plunger of the invention is separated from the gasket, since the full circumference of the valve seat provides access to the pocket and thence to the slot, the pressurized product flows at substantially maximum rate immediately. Likewise upon return of the valve seat by the spring, the flow is positively cut off at once. In the case of the structure of 2,777,735, since the entrance to the slot is up in the soft gasket, as the plunger is pushed downward, the slot opening is uncovered gradually, so that maximum spray does not occur without substantial movement of the spray head downward. Likewise upon return of the spray head, the cut-off of flow is not immediate for the same reason.

The advantages set forth above are achieved by the invention in a manner shown, and in addition others will become apparent to those skilled in this art as a preferred example of the invention is set forth in some detail with drawings which will illustrate the same.

In the said drawings:

FIG. 1 is a fragmentary side elevational view of a general nature showing the upper end of a pressurized spray package of the type with which the invention may be used.

FIG. 2 is a median enlarged sectional view taken generally through the spray package of FIG. 1 along the line 2—2 and in the direction indicated.

FIG. 3 is a sectional view on a greatly enlarged scale taken through the valve structure of FIG. 2 on the line 3—3 and in the direction indicated.

FIG. 4 is a fragmentary sectional view taken generally along the line 4—4 of FIG. 3 and in the direction indicated.

FIG. 5 is a fragmentary sectional view similar to that of FIG. 4 but of a modified form of the invention.

Referring now to the drawings, in FIGS. 1 and 2 there is illustrated a pressurized package which is designated generally by the reference character 20. There is a canister comprising a metal cylinder 22 having an upper dome 24 and a bottom end (not shown) all designed to contain the pressure to which such packages are subjected. The dome 24 has an upper opening formed with a rolled edge 26 and the entire valve structure and spray head are adapted to be secured to said opening in sealing engagement with said rolled edge 26.

Normally the filler, that is, the manufacturer who assembles the pressurized package with the pressurized product on the interior thereof, purchases the canisters and valve mechanisms from different sources. The invention herein concerns itself in no way with the canister, which may be of any suitable construction other than shown. Reference thereto in the claims is to be understood merely for indicating the environment in which the invention is used.

The product manufactured and sold to the filler by the valve maker consists of the parts shown in FIG. 2, exclusive of the canister dome 24. These parts are given general characters of reference, and specific details will also be identified. The character 30 is the metal cover member; the character 32 is the valve housing assembled to the cover member; the character 34 is the dip tube attached to the housing 32; and the character 36 is the spray head mounted on the valve mechanism contained in the housing.

The cover member 30 preferably is formed of sheet metal and has an annular curled over lip 38 formed on the edge of the body 40 which, as seen, provides an annular well 42 by reason of the formation of an upwardly extending boss 44 in the center thereof. The lip 38 has an inlay of gasket material 46 when furnished to the filler by means of which the filler may seal the cover member 30 in place when he crimps same to the rolled edge 26 of the canister. The valve housing 32 is a separate cylindrical structure having a flared upper end 48 and a constricted bottom end 50 into which the dip tube 34 is frictionally engaged. Both plastic and metal housings are used, but it may be assumed that the structure illustrated is metal. The dip tube is plastic and extends down to the bottom of the cylinder 22.

The housing is secured to the boss 44 by having its flared end 48 engaged against an annular perforated gasket 52 which is disposed in the top of the boss engaged against the bottom of the end wall 54 of the boss, and the assembly being tightly held in place by suitable crimps or pinches 55 upsetting the metal of the boss 44 inwardly in places around its circumference, under the flared end 48. The center of the end wall 54 is perforated at 56 and the resulting opening has the edges slightly turned up. This is common technique in the manufacture of these articles, and is only mentioned to explain the apparent thickening of the gasket at the hole 56. The gasket 52 is originally flat and is slightly relieved at the hole 56 to provide resilience and compressibility when the stem of the head is inserted. This will enable a sliding and sealing fit with the stem.

The housing 32 provides an enclosed valve chamber 58 which will permit the pressurized mixture to pass up the dip tube 34 and escape to the atmosphere out of the opening 56 unless prevented from doing so by some means blocking the opening 56 as well as the center perforation 60 in the gasket 52. This means is a valve plunger 62 which is reciprocable in the chamber 58, but which normally is pressed upward by a helical spring 64, the bottom end of which engages the inside of bottom end 50 of the housing 32 and the upper end of which engages upon the reduced diameter bottom end 66 of the plunger 62. The plunger 62 has a configuration which provides grooves and passageways such as shown at 68 in FIG. 3 past which the pressurized mixture may readily flow, while providing formations 70 to cooperate with the inner walls of the housing 32 to assure easy but guided reciprocation. Many suitable other arrangements can be used. The specific description of the drawings thus far is similar to what is already known. Hereinafter, the departure from the known structures will be set forth.

The upper end of the valve plunger 62 is provided with a central axially extending cylindrical socket 72 which has a central axial upwardly extending pilot projection 74 integral with the plunger 62, and thereby providing an annular cylindrical recess 76 about the pilot projection 74. The recess 76 is of a configuration matingly to receive the cylindrical hollow stem 80 of the spray head 36 with the end 78 bottomed so that the spray head is supported in a stable manner when engaged in the socket 72. The chamfer at said bottom end 78 is for pilot purposes. The stem 80 has a central expansion chamber 82 which leads to external atomizing means 84 which may be one or more orifices or passageways or swirler formations. The exact construction of the upper end of the spray head 36 is capable of considerable variation.

The upper end of the cylindrical socket 72 has an enlarged diameter portion just below the upper end of the plunger 62 thereby giving rise to an internal cylindrical pocket 86. This pocket is preferred to be of generally rectangular cross-section, as will be explained, and its presence gives rise to an annular valve seat 87 the diameter of which at its smallest dimension is greater than the principal internal diameter of the socket 72. This valve seat 87 is spring-urged against the bottom surface of the gasket 52 to prevent discharge of the pressurized contents of the canister 22, either when there is no spray head 36 and stem 80 is not engaged in the socket 72, or when there is such a spray head with its stem so engaged, but no pressure exerted downwardly against the spring 64.

The stem 80 is fully bottomed in the socket 72 and has a lower slot 88 which is clean through the wall of the stem and opens to the bottom thereof, but the upper end 90 of which is on the same level as or slightly below the level of the bottom surface 92 of the gasket 52. Since the axial penetration of the stem 80 into the socket is limited and defined by engagement of the bottom end 78 in the recess 76. the said upper end 90 of the slot is positively located relative to the pocket 86 and will always maintain this location so that the metering afforded by the exposed portion of the slot will be constant. During use the slot 88 will never enter the gasket 52. If the pocket 86 should clog or material accumulate in slot 88, rotating of the spray head may relieve the decrease in discharge. This will not scrape the rubber of the gasket 52 as might occur if the slot extended into the gasket. Pulling the spray head 36 out of the gasket 52 will cause a wiping of the slot 88.

Also, the constricting force of the gasket 52 on the stem 80 which might tend to close the slot 88 is a minimum since the slot is not open at the point of application of greatest constricting force.

The construction which includes the pocket 86 and narrow valve seat 87 is found to be highly efficacious to cause spraying to occur the very moment that the spray head 36 is depressed, as opposed to most apparatus of this general type without the pocket, in which substantial depression of the spray head is required to obtain maximum and uniform spray rate. It is believed that the better spray rate is caused by the immediate filling of the pocket 86 with the pressurized product. In the case of the construction of Patent 2,777,735, the slot in the gasket must be withdrawn fully for maximum spray rate and returned fully into the gasket for full cut off. The rectangular cross-section of the pocket is also believed to be a factor, because it makes available to the pressurized atmosphere in the housing 32 the complete metering entrance, as at 94 to the slot 88. The provision of a triangular or quadrant shaped cross-section of the pocket 86 will somewhat constrict flow for the intial downward movement of the valve plunger 62 to give uneven spraying at the start of such spraying. Even more important, since these articles are molded from plastic which varies in dimension during cooling and molding, it is not feasible accurately to define the precise bottom edge of a quadrant or traingular shaped pocket and hence exact metering of the exposed slot opening is not in such cases fully predictable.

The construction of the valve plunger of FIG. 5 differs from that described thus far in only one respect. The pocket 86 is axially deeper. The stem 80 also will be conformingly changed so that its slot 88 does not extend quite so high relative to the valve seat 87. To give some concept of the dimensions invovled, where the thickness of the wall of the plunger 62 at the socket 72 is about .024", the radial dimension of the pocket 86 is about half that, or .012". In FIG. 4, the axial depth of the pocket is .010" while in FIG. 5, it is chosen as about .020". The reason for increasing the depth is recognition of a problem previously mentioned herein, indirectly.

The center of the gasket 52 is free to expand downwardly as well as upwardly and in addition spring pressure drives the plunger 62 into the gasket. The resilience of the gasket, as a practical matter, will admit of some sinking of the upper end of all plungers into the gasket. The degree depends upon the hardness of the gasket, the pressure of spring 64, the solvents and chemicals of the pressurized product, the area of valve seat 87 and perhaps other factors. An annular bulge 98 of the gasket would not only exist when the valve is closed, but may well follow the plunger downward as it is depressed during use due to the resilience of the rubber especially around the relatively uncompressed annular opening 60. In a shallow pocketed plunger and stem construction somewhat like that of FIG. 4, this could certainly interfere with the spray rate if it partially blocked opening 94 at the beginning of the downward stroke. In addition the bulge 98 would be subject to scraping if stem 80 is rotated by the user. The longer pocket of FIG. 5 assures that the slot 88 will remain open for immediate and continued spraying during use. Since the slot 88 of FIG. 5 is even further below the valve seat 87, it is further away from constricting forces of the gasket 52, the bulge 98 having practically no constrictive force on stem 80. It will be noted that since the slot 88 is open clean through the stem for its entire length, there is plenty of volume available at its bottom end to accumulate any solids or residue which adheres to the inner walls of the expansion chamber 82 and runs down, without blocking passage of the flow of pressurized product.

It is believed that the invention should readily be understood from the above description, and that it is capable of being used by various structures which do not in any way depart from the spirit or scope of the invention, as defined in the appended claims. The particular configuration of the pockets is a preferred one, but other configurations will enable those skilled in this art to practice the invention. For example, it was found desirable to round the upper corner of the verticcal wall forming the pocket 86 as shown at 96 in FIGS. 4 and 5, but this could be sharp if desired. This is the inner edge of the valve seat 87. Likewise the proportions and dimensions, and even the exact configuration of the pocket itself could be varied, as for example indicated by FIG. 5, often depending upon the nature of the product being dispensed, the propellant and the carrier. Sometimes pockets not even as deep axially as in FIG. 4 may be satisfactory where there is little bulging or distortion of the rubber gasket.

What is desired to secure by Letters Patent of the United States is:

1. A valve structure for a pressurized spray package of the type having a cover member with a valve housing and dip tube secured to the bottom thereof and clamping an annular resilient gasket in the cover member with the center opening of the gasket aligned with a hole in the cover member, a reciprocable spring pressed plunger in the housing having an upper annular valve seat sealingly engaged against the gasket and a cylindrical socket opening to the upper end of the plunger coaxial with the valve seat and aligned with the center opening and hole, and having a removable spray head with a depending integral cylindrical hollow stem engaged into the socket through the gasket sealed by and slidable relative to the gasket with a side slot through the wall of the stem, said slot being open clean through for substantially its entire length to provide communication between the hollow stem and the housing when the user presses the spray head and plunger down against the spring pressure to unseat the valve seat so that pressurized product may flow past the valve seat and into the slot; said valve structure comprising an annular pocket in the plunger radially inward of the valve seat and extending downward therefrom thereby spacing the stem from the valve seat, said pocket being generally rectangular in cross-section at its periphery and the slot of the stem terminating at its upper end in the pocket so that said pocket and said slot are in constant communication when said spray head is seated in said socket.

2. A structure as claimed in claim 1 in which the axial dimension of the pocket is substantially greater than its radial dimension at its periphery, and the point of termination of the upper end of the said slot is substantially below the level of the valve seat.

3. A structure as claimed in claim 1 in which the annular corner defined by the junction of the pocket and the valve seat is rounded.

4. An assembly which is adapted to be installed into a container for enabling the dispensing of pressurized product introduced into said container and which comprises a cover member having means to enable the securement thereof to the top of the container, a boss in the upper end of the cover member with a central passageway formed in the boss, an annular resilient gasket aligned with the passageway and a valve housing clamping the gasket into the boss and having a dip tube connected to enable introduction of pressurized product into the housing, a plunger reciprocable vertically in the housing and a spring urging the same upward, an annular valve seat formed on the upper end of the plunger and having a cylindrical socket coaxial therewith and aligned with the central opening of the gasket with the socket opening upward to the valve seat, an annular pocket surrounding the upper end of the socket and thereby spacing the valve seat radially from the socket, said pocket having a substantially rectangular configuration at its periphery, a spray head having an external orifice and an integral depending cylindrical stem provided with a bore communicating with the orifice, the spray head being introduced into the socket through the passageway and central opening of the gasket sealingly and slidingly engaged with the gasket but removable therefrom and having the lower end of the stem matingly engaged in the socket in predetermined positive relation to the bottom end of the socket, a clean through slot extending from a bottom end of the stem up to a point which is below the level of the valve seat when said stem is in said predetermined relation, and having its uppermost limit below the gasket so as not to enter the same during normal operation of the spray head said slot providing communication between the pocket and the bore so that when the assembly is so installed, if the spray head is pushed down pressurized product will pass from the housing past the valve seat and into the pocket and from there through said side opening and will enter the bore and be sprayed from the orifice.

5. An assembly as claimed in claim 4 in which the bottom end of the stem is adapted to bottom in the socket.

6. An assembly as claimed in claim 4 in which the axial dimension of the pocket is greater than the radial dimension at its periphery and the said side opening is at the lower portion of the pocket.

7. An assembly as claimed in claim 5 in which the slot extends from the bottom end of the stem up to the pocket when the stem is bottomed.

8. A valve structure for a pressurized spray package of the type having a cover member with a valve housing and dip tube secured to the bottom of said housing and clamping an annular resilient gasket in the cover member with the center opening of the gasket aligned with a hole in the cover member, a reciprocable spring-pressed plunger in the valve housing having an upper annular valve seat sealingly engaged against the gasket and a cylindrical socket opening to the upper end of the plunger coaxial with the valve seat and aligned with said center opening and hole, and having a removable spray head with a depending integral cylindrical hollow stem providing an expansion chamber therein engaged in the socket through the gasket sealed by and slidable relative to the gasket with a side slot through the wall of the hollow stem, said slot being clean through for substantially its entire length to provide communication between said expansion chamber and the valve housing when the spray head is depressed to move the plunger against the spring pressure to unseat the valve seat so as to permit pressurized product to flow past the valve seat and into the expansion chamber through said slot, said stem and socket matingly engaging along their cylindrical circumferential surfaces commencing at the bottom extremities of the stem and socket respectively, said valve structure comprising an annular pocket in the plunger radially inward of the valve seat and extending downward therefrom thereby spacing the stem from the valve seat, and the slot having its upper end only opening into said pocket so that said pocket and interior of the stem are in constant communication one with the other only through said upper end of the slot when said spray head is engaged in said socket.

References Cited by the Examiner

UNITED STATES PATENTS

| | | |
|---|---|---|
| 2,777,735 | 1/1957 | Green. |
| 2,806,739 | 9/1957 | Drell _____ 239—579 X |
| 2,862,648 | 12/1958 | Cooksley et al. ____ 239—573 X |
| 2,913,154 | 11/1959 | Kuffer. |

RAPHAEL M. LUPO, *Primary Examiner.*